July 14, 1931.  E. O. ELLIOTT  1,814,909
LOCOMOTIVE TRUCK
Filed Feb. 11, 1930   3 Sheets-Sheet 1
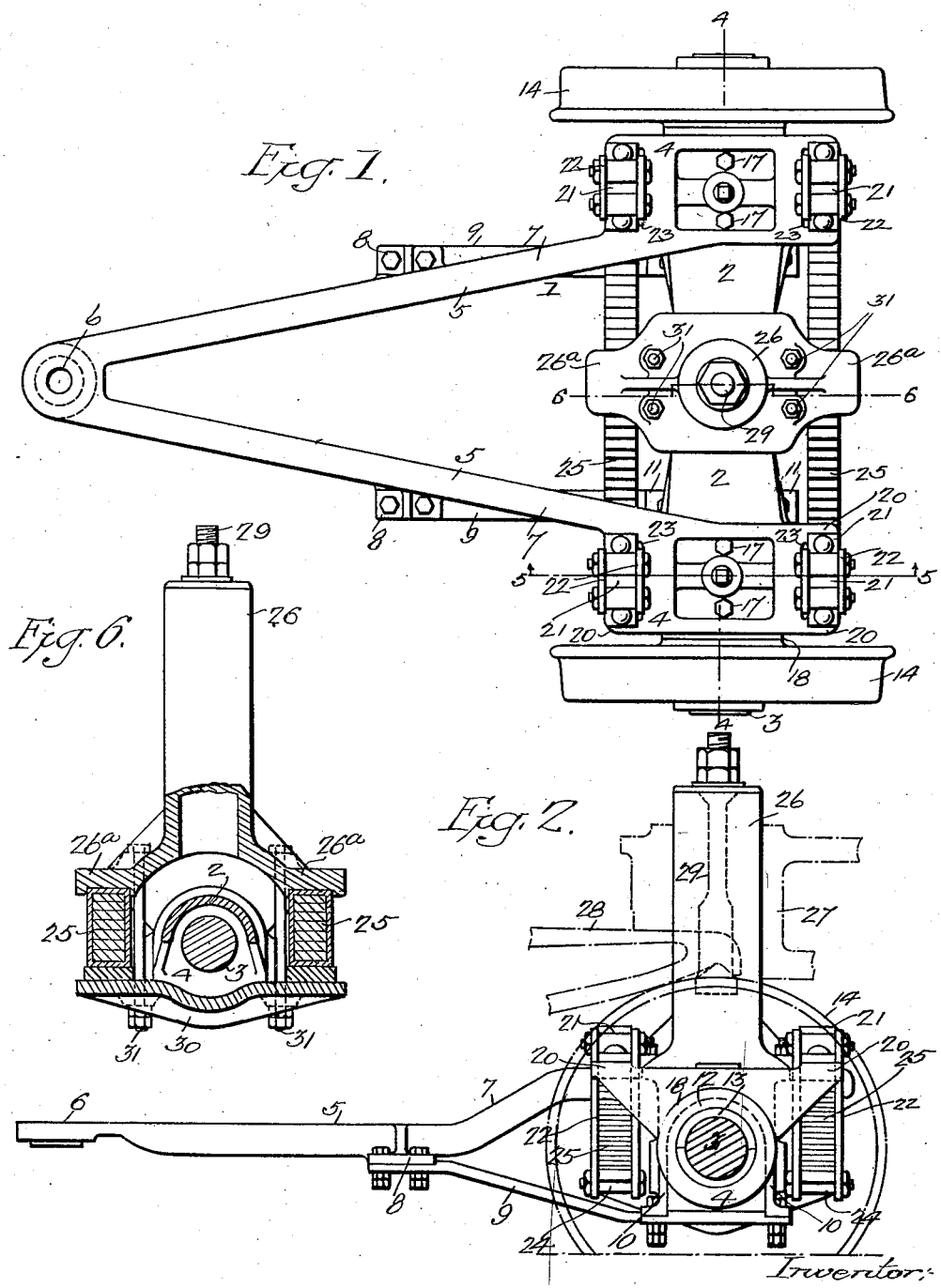

July 14, 1931.  E. O. ELLIOTT  1,814,909
LOCOMOTIVE TRUCK
Filed Feb. 11, 1930    3 Sheets-Sheet 2
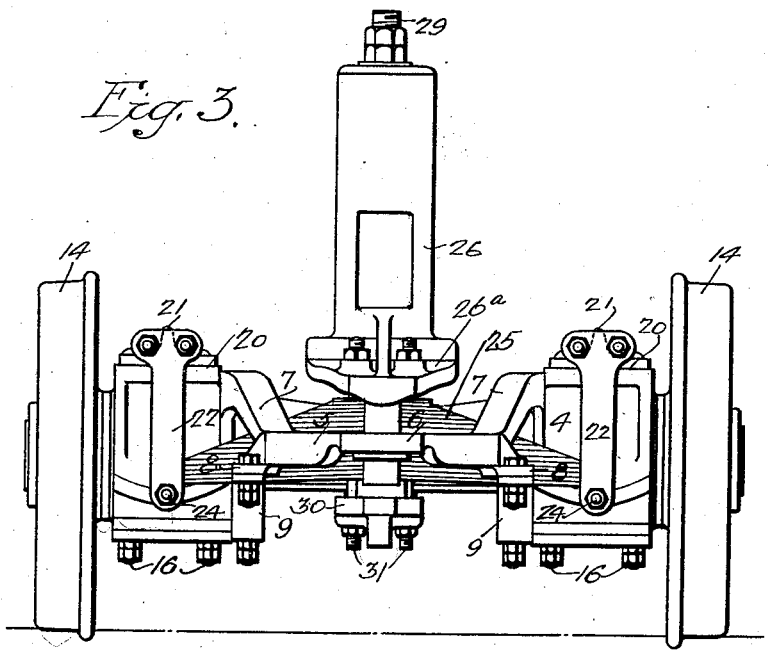
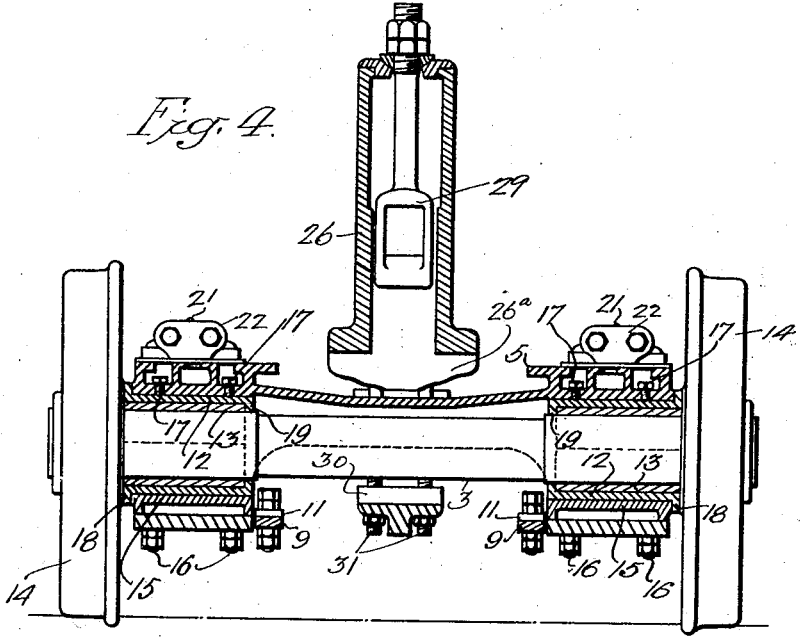
Inventor:
Edward O. Elliott
by his Attorneys

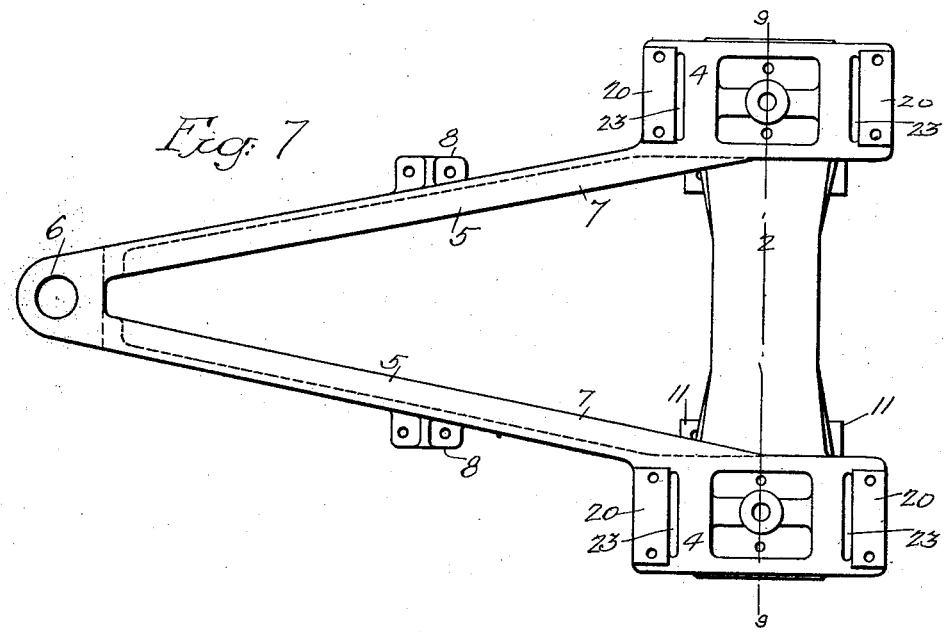
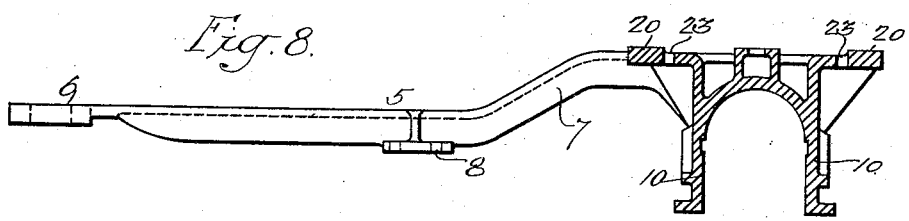
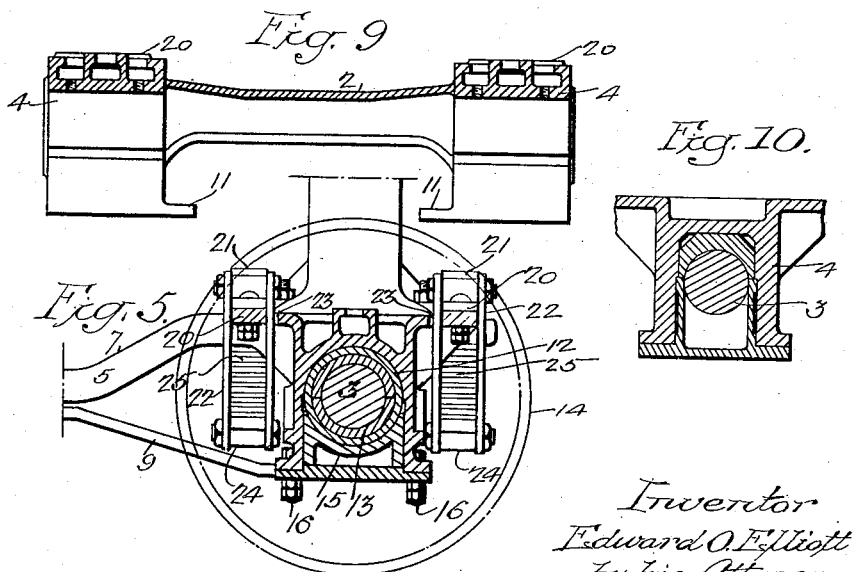
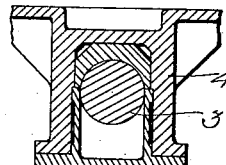

Patented July 14, 1931

1,814,909

UNITED STATES PATENT OFFICE

EDWARD O. ELLIOTT, OF JENKINTOWN, PENNSYLVANIA

LOCOMOTIVE TRUCK

Application filed February 11, 1930. Serial No. 427,528.

My invention relates to locomotive trucks of the two-wheel type, in which the bearings for the axle of the truck are on the inner side of the wheels. Trucks of this type have a radius bar and are pivoted from a given point some distance from the axle.

One object of this invention is to make a frame of a truck of the above-mentioned type in an integral casting.

A further object of the invention is to make the lower portion of the radius bar separate from the main portion thereof and to secure the lower portion to the boxes in which the bearings are mounted.

A still further object of the invention is to provide a truck of the above-mentioned type with floating bushings.

In the accompanying drawings:

Fig. 1 is a plan view of my improved locomotive truck;

Fig. 2 is a side view;

Fig. 3 is an end view;

Fig. 4 is a transverse sectional view on the line 4—4, Fig. 1;

Fig. 5 is a longitudinal section on the line 5—5, Fig. 1;

Fig. 6 is a sectional view on the line 6—6, Fig. 1;

Fig. 7 is a plan view of the integral frame;

Fig. 8 is a side view of the frame;

Fig. 9 is a transverse sectional view on the line 9—9, Fig. 7; and

Fig. 10 is a view of a form of bearing that may be used.

1 is an integral frame consisting of a transverse housing 2, through which the axle 3 extends. The central portion of the housing is U-shaped in cross-section, and at each end of this housing are integral bearings 4, in which are the bushings for the axle 3. Extending from the upper ends of the two bearings are members 5 of a radius bar. These members are connected at their outer ends to a bearing 6 for the fulcrum pin, on which the truck swings when passing around a curve. Each member 5 of the radius bar is depressed at 7 and has a laterally projecting pad 8 to which the detachable brace 9 of the radius bar is secured by bolts or other fastenings. Each detachable brace of the radius bar extends across the depending members 10 of the bearings 4 and is secured to lugs 11, projecting inwardly from each member 10 of the bearing 4, so that the brace 9 not only acts to reinforce the radius bars but acts also to hold the two side members 10 of the bearings in alignment. The lugs 11 projecting inwardly from the bearings, allow the bushings to be removed without disturbing the braces 9 of the radius bar.

In each bearing 4 is a fixed bushing 12 and within the fixed bushing is a floating bushing 13. This floating bushing is free to revolve on the axle and in the fixed bushing. Both bushings are of necessity made in halves so that they can be placed on the axle and removed therefrom without disturbing the wheels 14, which are secured to the axle in the ordinary manner.

Each fixed bushing 12 is held from revolving by a cellar 15, which is located within the main bearing 4 and is held in place by four stud bolts 16 in the present instance. The fixed bushing is also held by set screws 17 in the upper portion of the bearing 4. The fixed bushing 12 has a wearing flange 18 at its outer end, against which the wheel hub bears and an integral flange 19 for keeping the slotted bushing in place. The bearing is lubricated by grease or oil in any manner desirable.

Projecting from the housing are integral brackets 20 as shown in Figs. 7 and 8, to which are attached the link-bearings 21 and from these bearings are hung the links 22. These links are arranged in pairs and the inner link of each pair passes through a slot 23 in the bracket 20. At the upper end of each pair of links are two cross-pins which rest in the bearings 20 and are free to rock thereon. At the lower end of each pair of links is a cross-pin 24 on which rest the ends of the transverse carrying springs 25, which support a combined center pin and swing bolster 26. The links are of the well-known three-point suspension type and permit the truck to adjust itself to the curvature of the track in the usual manner. The springs 25 are clamped between the extended base 26a of the center pin 26 and a safety bar 30 by bolts 31. The combined center pin and swing bolster 26 is guided by a frame cross-tie 27. The proportion of the weight which the truck is to carry is transmitted through any suitable equalizer lever 28 and link 29 supported by the center pin 26. The wheels may be secured rigidly to the axle or may have extending spindles on which are mounted roller-bearings which carry the wheels.

By the above invention it will be seen that the frame of the truck is made as an integral casting, including the transverse housing, the bearings in which the bushings are mounted, and the radius bars and brackets from which the springs are suspended. This construction makes a comparatively light frame, which is very substantial. By making the detachable braces 9—9 separate from the radius bars and extending them across the depending members of the bearings, they not only act as braces for the radius bars but also act as braces for the main structure of the truck, and by locating these braces back of the bearings the bearings can be readily removed without disturbing the braces.

In place of the floating cylindrical bushings shown in Fig. 5, the ordinary bearing block may be used, which is lubricated with oil and waste contained in a cellar as shown in Fig. 10, or any suitable type of roller-bearing may be used if desired.

I claim:

1. The combination in a two-wheel truck having inside bearings, of a housing U-shaped in cross-section extending transversely of the truck and through which the axle extends, said housing having bearings at each end for the reception of bushings in which the axle is mounted; and an integral radius bar extending from the upper portion of each bearing and terminating in a pivot bearing, said bearings having depending portions and inwardly extending lugs to which a brace of the radius bar can be secured.

2. An integral frame for a two-wheel truck having inside bearings; a transversely extending housing for the axle having U-shaped bearings at each end; brackets projecting from each bearing, from which the springs of the truck are suspended; radius bars extending from each bearing terminating in a pivot bearing, each radius bar having a pad; and inwardly extending brackets projecting from the U-shaped bearings, to which braces for the radius bars can be secured.

3. The combination in a two-wheel locomotive truck having inside bearings, of a transverse housing integral with the frame and having bearings at each end; a radius bar extending from each bearing, said bars terminating in a central pivot bearing; and an axle extending through the housing and mounted in bearings at each end of the housing, the lower portions of the bearings having inturned lugs, each member of the radius bar having a pad and a brace at each side of the truck, extending from the pads on the radius bar to the two sets of lugs on each bearing, said braces extending under the axle and tending to reinforce the bearings and the radius bar.

EDWARD O. ELLIOTT.